(12) United States Patent
Bennett et al.

(10) Patent No.: US 10,485,379 B2
(45) Date of Patent: Nov. 26, 2019

(54) AUTOMATED GAS COOKING SYSTEM

(71) Applicant: W.C. BRADLEY CO., Columbus, GA (US)

(72) Inventors: Chris Bennett, Opelika, AL (US); Alex Gafford, Midland, GA (US)

(73) Assignee: W.C. BRADLEY CO., Columbus, GA (US)

( * ) Notice: Subject to any disclaimer, the term of this patent is extended or adjusted under 35 U.S.C. 154(b) by 220 days.

(21) Appl. No.: 15/644,245

(22) Filed: Jul. 7, 2017

(65) Prior Publication Data

US 2018/0008095 A1 Jan. 11, 2018

Related U.S. Application Data

(60) Provisional application No. 62/360,534, filed on Jul. 11, 2016.

(51) Int. Cl.
*A47J 37/07* (2006.01)
*H05B 1/02* (2006.01)

(52) U.S. Cl.
CPC ........ *A47J 37/0786* (2013.01); *H05B 1/0266* (2013.01); *A47J 37/0713* (2013.01)

(58) Field of Classification Search
CPC .................................................. A47J 37/0786
USPC ..................................... 431/13, 14; 126/39 R
See application file for complete search history.

(56) References Cited

U.S. PATENT DOCUMENTS

| 2008/0038681 A1* | 2/2008 | Huang ................... F23N 5/242 431/13 |
| 2014/0165849 A1* | 6/2014 | Mateos Martin ....... A47J 36/32 99/342 |

* cited by examiner

*Primary Examiner* — Avinash A Savani
(74) *Attorney, Agent, or Firm* — Dennis D. Brown; Brown Patent Law, P.L.L.C.

(57) ABSTRACT

An outdoor gas cooking system having multiple burners in which, if the individual manual control valves for all of the burners are placed on a high heat setting or some other specified or recognized activation position, a single electronic master control valve can be activated to control the total gas fuel rate to all of the burners in the cooker based, for example, upon a cooking or operational control set point or upon a target flow rate equaling the sum of the design flow rates of all of the burners at the current operating set points of the manual valves.

24 Claims, 9 Drawing Sheets

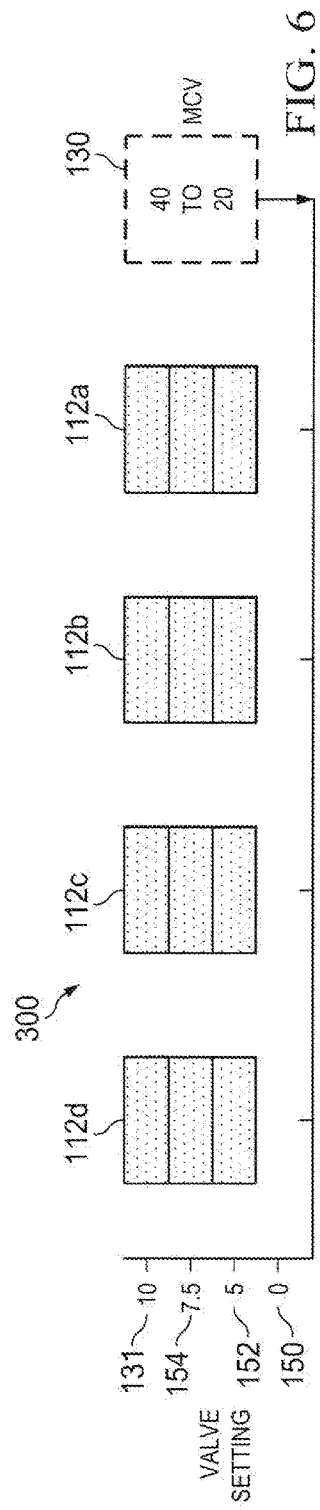
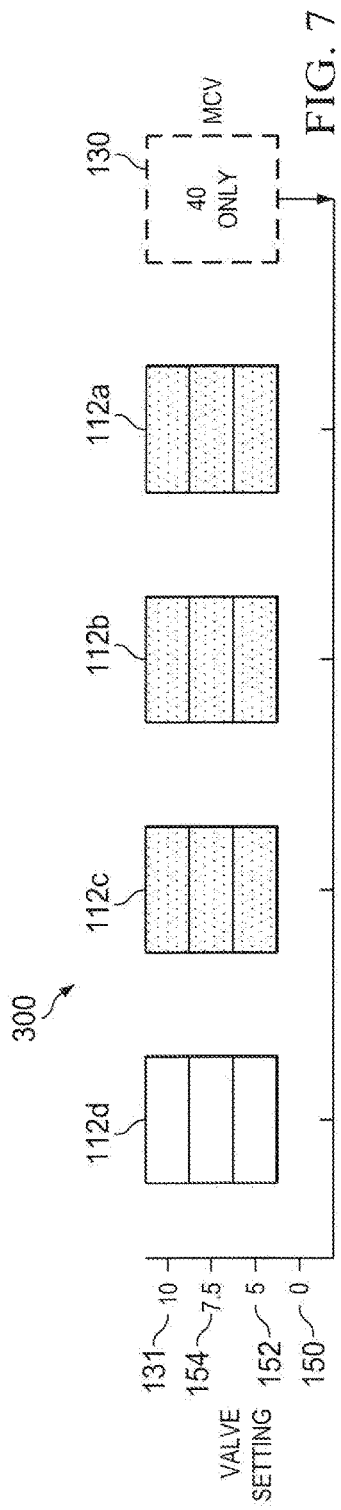
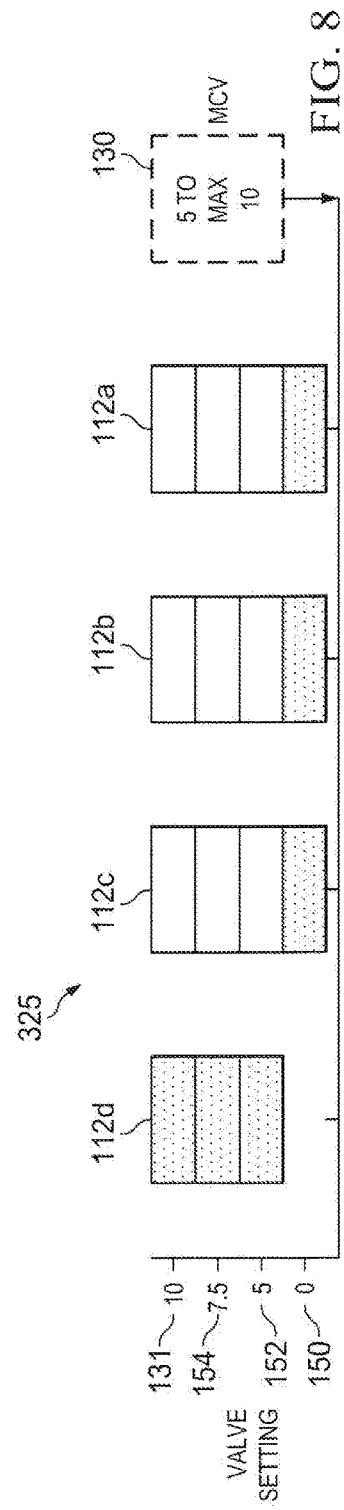

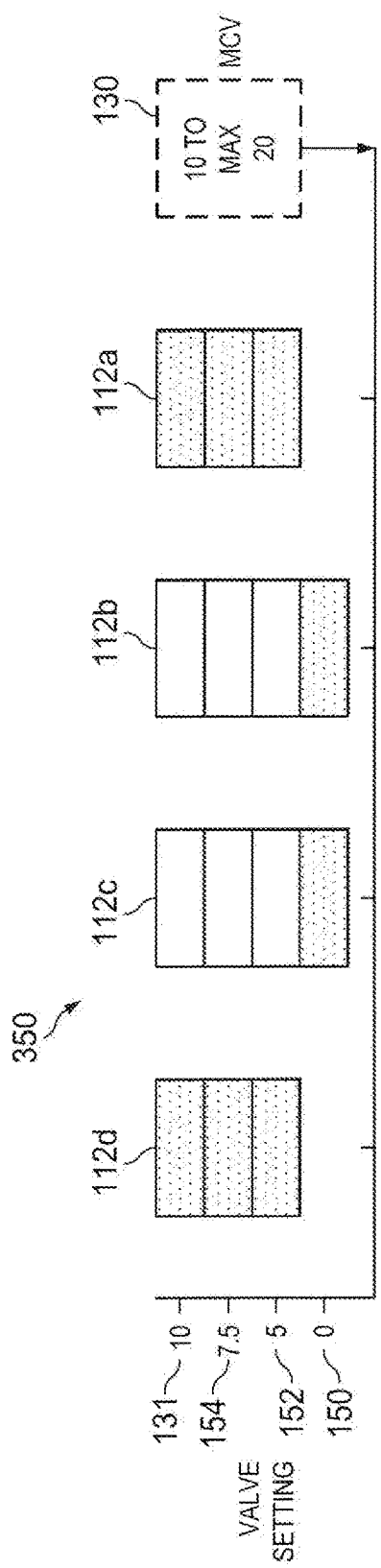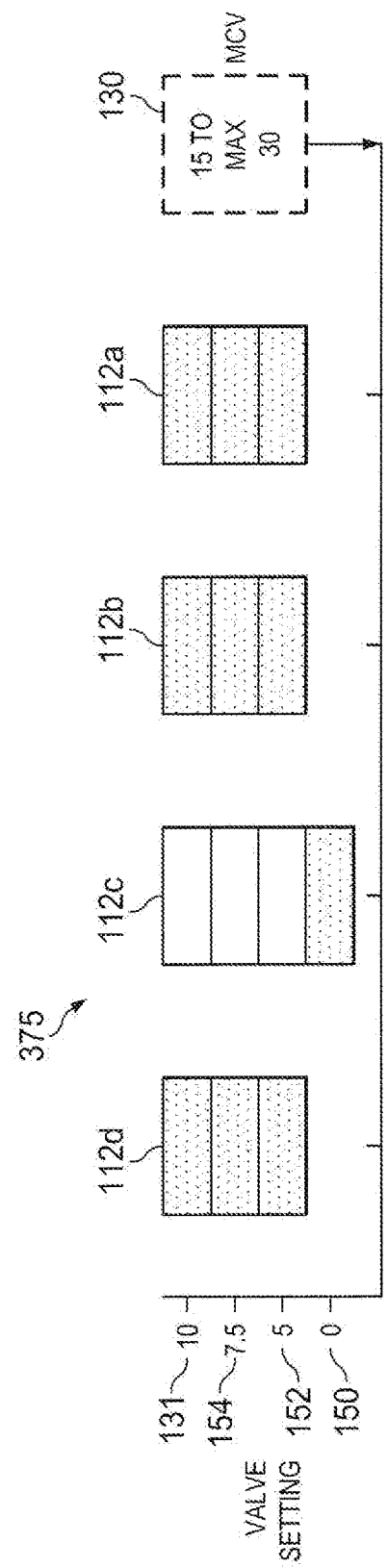

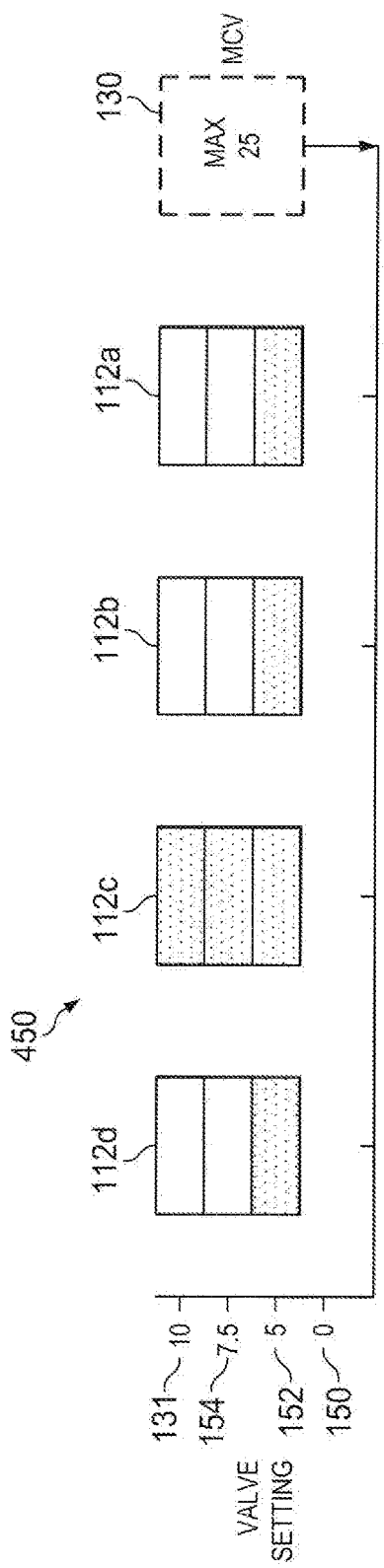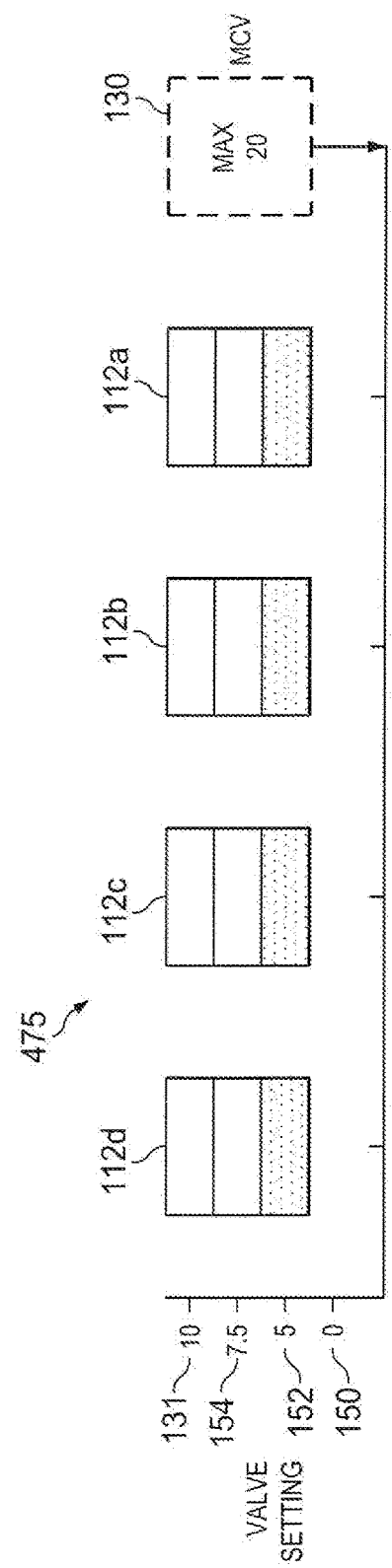

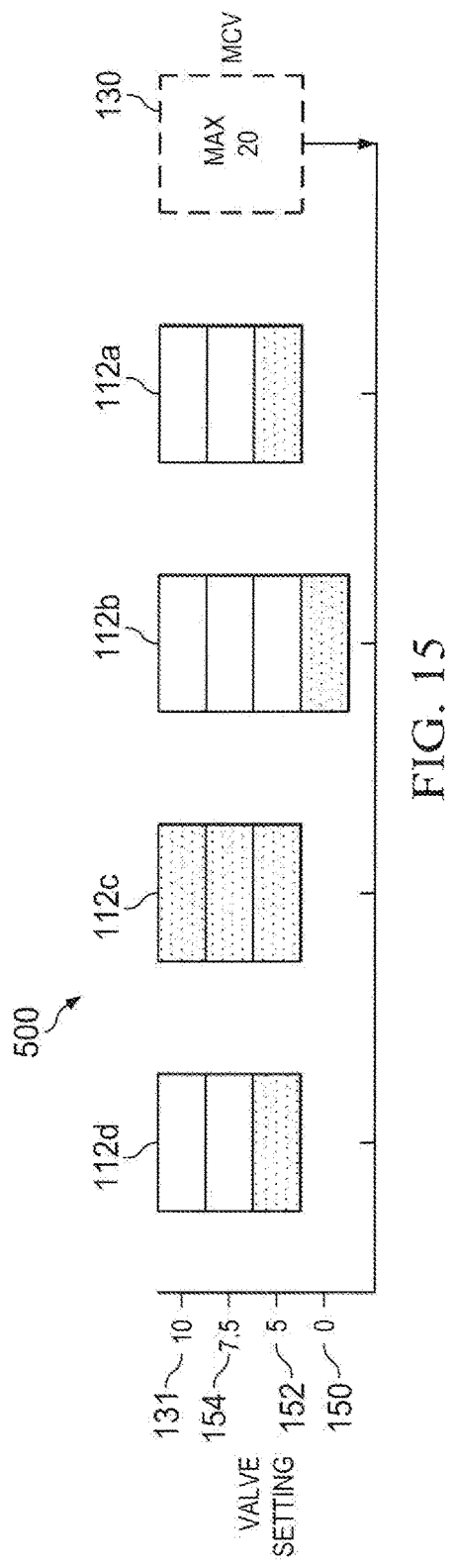

AUTOMATED GAS COOKING SYSTEM

RELATED CASE

This application claims the benefit of U.S. Provisional Patent Application Ser. No. 62/360,534 filed on Jul. 11, 2016 and incorporates said provisional application by reference into this document as if fully set out at this point.

FIELD OF THE INVENTION

The present invention relates to automated outdoor cookers. More particularly, the present invention relates to systems for automatically controlling fuel rates and operating procedures in outdoor grills and other outdoor cookers.

BACKGROUND OF THE INVENTION

In the past ten years, numerous cooking appliances have been developed which are equipped with on-board electronic displays and/or remote displays which provide textual or graphical information relative to the status of the food being cooked. In some cases, the temperature of the food being cooked is monitored over time and the temperature is displayed with respect to a target temperature set by the user. This information is displayed in many cases as a pair of numerical values or as a graph of temperature versus time. In other cases, the display provides a numerical cooking timer indicating the amount of time remaining until the product is expected to be done.

In addition, it has also been proposed that gas grills be equipped with semi-automated heating and/or cooking control systems which can be digitally connected to Smart devices such as tablets, cell phones, and the like. An example of one such system for an outdoor grill having three burners is shown and described in US2016/0037966 to Chin et. al. In the grill control system described in US 2016/0037966, it is necessary that each of the three individual burners contained in the grill be equipped with its own independent, automated electric control valve and temperature instrument system for controlling the rate of gas flow delivered to the burner.

As will be apparent, a primary disadvantage of using this prior art system for controlling grills having multiple burners is the excessive cost and complexity of having to use separate electronic fuel control valves and related individualized systems and equipment for all of the burners. The necessity of having to use multiple electronic fuel control valves and individualized control systems also contributes to reduced mechanical reliability, reduced heating consistency across the grill, and increased maintenance costs.

SUMMARY OF THE INVENTION

The present invention provides an outdoor gas cooker having multiple (i.e., a plurality of) burners and an automated control system therefor which satisfy the needs and alleviate the problems discussed above.

In one aspect, there is provided an outdoor gas cooker and a control system therefor in which only a single electronic control valve for the gas fuel is used to simultaneously control the operation of multiple burners in the cooker. The single electronic gas fuel control valve used to simultaneously control the gas fuel rate for the entire set of burners in the cooker is referred to herein as a Master Control Valve (MCV).

In another aspect, each of the multiple burners of the outdoor gas cooker is also preferably equipped with its own individual manual control valve for manually controlling the rate of flow of the gas fuel to the individual burner. In one scenario for operating this system, the MCV preferably cannot operate to automatically control the rate of flow of the fuel gas to the multiple burners in the cooker unless the manual control valves for all of the burners are set to a MCV activation position. The MCV activation position will preferably be, for example, a maximum flow position of the manual control valves, a designated high heat cooking position (i.e., a designated manual cooking control setting) of the manual control valves, or any other position (preferably at or above 50% open) wherein the simultaneous positioning of all of the manual control valves in this position will cause or allow the activation of the MCV for controlling the rate of fuel gas flow to the entire set of burners.

However, in this control scenario, if at least one of the individual manual control valves for the multiple burners is not moved to, or is taken out of, the MCV activation position, and except for a possible time lag, the MCV preferably will not operate to control the rate of flow of the gas fuel to the burners. Rather, when at least one of the manual control valves in this control scenario is not in the MCV activation position, and unless a system shut-down event has occurred, the MCV will preferably remain in a fully open position (preferably a 100% open position) so that each individual burner will be manually controlled using only the manual control valve for the burner.

In another aspect, there is provided an outdoor cooking system which preferably comprises: (a) a housing; (b) a control unit; (c) two or more gas fuel burners or burner elements in the housing, each of the gas fuel burners or burner elements having a gas fuel inlet which includes a manual control valve and a valve position detector which automatically sends or relays an electronic signal indicating at least one operating position of the manual control valve; (d) a gas fuel supply conduit which supplies the gas fuel to the gas fuel inlets of the gas fuel burners or burner elements; and (e) a master control valve in the gas fuel supply conduit upstream of all of the manual control valves.

In one control scenario using this system, the control unit preferably automatically determines whether all of the manual control valves are in a master control valve activation position so that when all of the manual control valves are in the master control valve activation position, the control unit allows a user to activate, or the control unit itself automatically activates, a master control function of the master control valve wherein the master control valve automatically controls a total rate of flow of the gas fuel to all of the gas fuel burners or burner elements in the housing based upon at least one cooking process control set point.

In addition, it is also preferred in this control scenario that, when the control unit detects that at least one of the manual control valves is not in the master control valve activation position, the control unit will not permit the master control function of the master control valve to be activated.

In another aspect, there is provided an outdoor cooking system which preferably comprises: (a) a housing; (b) a control unit; (c) two or more gas fuel burners or burner elements in the housing, each of the gas fuel burners or burner elements having a gas fuel inlet which includes a manual control valve and a valve position detector which automatically sends or relays to the control unit an electronic signal indicating at least one operating position of the manual control valve; (d) a gas fuel supply conduit which supplies the gas fuel to the gas fuel inlets of the gas fuel burners or burner elements; and (e) a master control valve in the gas fuel supply conduit upstream of all of the manual control valves.

In one control scenario using this system, the control unit preferably comprises a processing unit and a program code which is embodied on a computer readable storage component and is readable by the processing unit to automatically determine whether all of the manual control valves are in a master control valve activation position and to operate the master control valve according to a programmed procedure in which, when all of the manual control valves are in the master control valve activation position, a user is allowed to activate, or the control unit itself automatically activates, a master control function of the master control valve wherein the master control valve automatically controls a total rate of flow of the gas fuel to all of the gas fuel burners or burner elements in the housing based upon at least one cooking process control set point.

In addition, it is also preferred in this control scenario that when in accordance with the programmed procedure of the program code embodied on the computer readable storage component the control unit determines that at least one of the manual control valves is not in the master control valve activation position, the programmed procedure will not permit the master control function of the master control valve to be activated.

In another aspect, there is provided an outdoor cooking system which preferably comprises: (a) a housing; (b) a control unit; (c) two or more gas fuel burners or burner elements in the housing, each of the gas fuel burners or burner elements having a gas fuel inlet which includes a manual control valve and a valve position detector which automatically sends or relays to the control unit an electronic signal indicating an operating position of the manual control valve; (d) a gas fuel supply conduit which supplies a gas fuel to the gas fuel inlets of the gas fuel burners or burner elements; and (e) a master control valve in the gas fuel supply conduit upstream of all of the manual control valves. The control unit automatically determines whether the manual control valve for each of the burners or burner elements is either closed or in a master control valve activation position so that when the manual control valves for all of the burners or burner elements are either closed or in the master control valve activation position and the manual control valve of one or more of the burners or burner elements is in the master control valve activation position, the control unit allows a user to activate, or the control unit itself automatically activates, a master control function of the master control valve wherein the master control valve automatically controls a total rate of flow of the gas fuel, based upon at least one cooking process control set point, to all of the one or more gas fuel burners or burner elements in the housing for which the master control valve for the gas fuel burner or burner element is in the master control valve activation position.

In yet another aspect there is provided an outdoor cooking system which preferably comprises: (a) a housing; (b) a control unit; (c) two or more gas fuel burners or burner elements in the housing, each of the gas fuel burners or burner elements having a gas fuel inlet which includes a manual control valve having a plurality of manual set points and a valve position detector which automatically sends or relays to the control unit an electronic signal indicating a current manual set point of the manual control valve, wherein one of the manual set points is an off position of the manual control valve for a zero design flow rate of a gas fuel and each remaining one of the manual set points is a partially or fully open position of the manual control valve having a design flow rate of the gas fuel greater than zero corresponding thereto; (d) a gas fuel supply conduit which supplies the gas fuel to the gas fuel inlets of the gas fuel burners or burner elements; and (e) a master control valve in the gas fuel supply conduit upstream of all of the manual control valves. The control unit automatically determines the current manual set point of each of the manual control valves and determines a total of the design flow rates corresponding to the current set points of all of the manual control valves. The control unit also allows a user to activate, or the control unit itself automatically activates, a master control function of the master control valve wherein the master control valve automatically controls a total flow of the gas fuel, to all of the gas fuel burners or burner elements in the housing for which the manual control valve of the gas fuel burner or burner element is partially or fully open, at a rate which is substantially the total of the design flow rates corresponding to the current set points of all of the manual control valves.

The use of the single Master Control Valve (MCV) in the inventive cooker and control system reduces equipment, manufacturing, and maintenance costs and improves system reliability, since only one Master Control Valve is needed for electronically controlling the flow of gas fuel to a plurality (preferably all) of the burners in the cooking chamber.

Further aspects, features, and advantages of the present invention will be apparent to those in the art upon examining the accompanying drawings and upon reading the following Detailed Description of the Preferred Embodiments.

BRIEF DESCRIPTION OF THE DRAWINGS

FIG. 6 schematically illustrates the operation of the automated control procedure 300 with the manual control valves for all of the burner elements 112a, 112b, 112c, and 112d in a MCV activation (high flow) setting 131.

FIG. 7 schematically illustrates the operation of the automated control procedure 300 wherein the manual control valve one of the burner elements 12a is not in the MCV activation (high flow) setting 131.

FIG. 8 schematically illustrates another control scenario 325 which can be implemented using the inventive fuel gas control system 225.

FIG. 9 schematically illustrates another control scenario 350 which can be implemented using the inventive fuel gas control system 225.

FIG. 10 schematically illustrates another control scenario 375 which can be implemented using the inventive fuel gas control system 225.

FIG. 13 schematically illustrates another control scenario 450 which can be implemented using the inventive fuel gas control system 225.

FIG. 14 schematically illustrates another control scenario 475 which can be implemented using the inventive fuel gas control system 225.

FIG. 15 schematically illustrates another control scenario 500 which can be implemented using the inventive fuel gas control system 225.

DETAILED DESCRIPTION OF THE PREFERRED EMBODIMENTS

Figure 1:
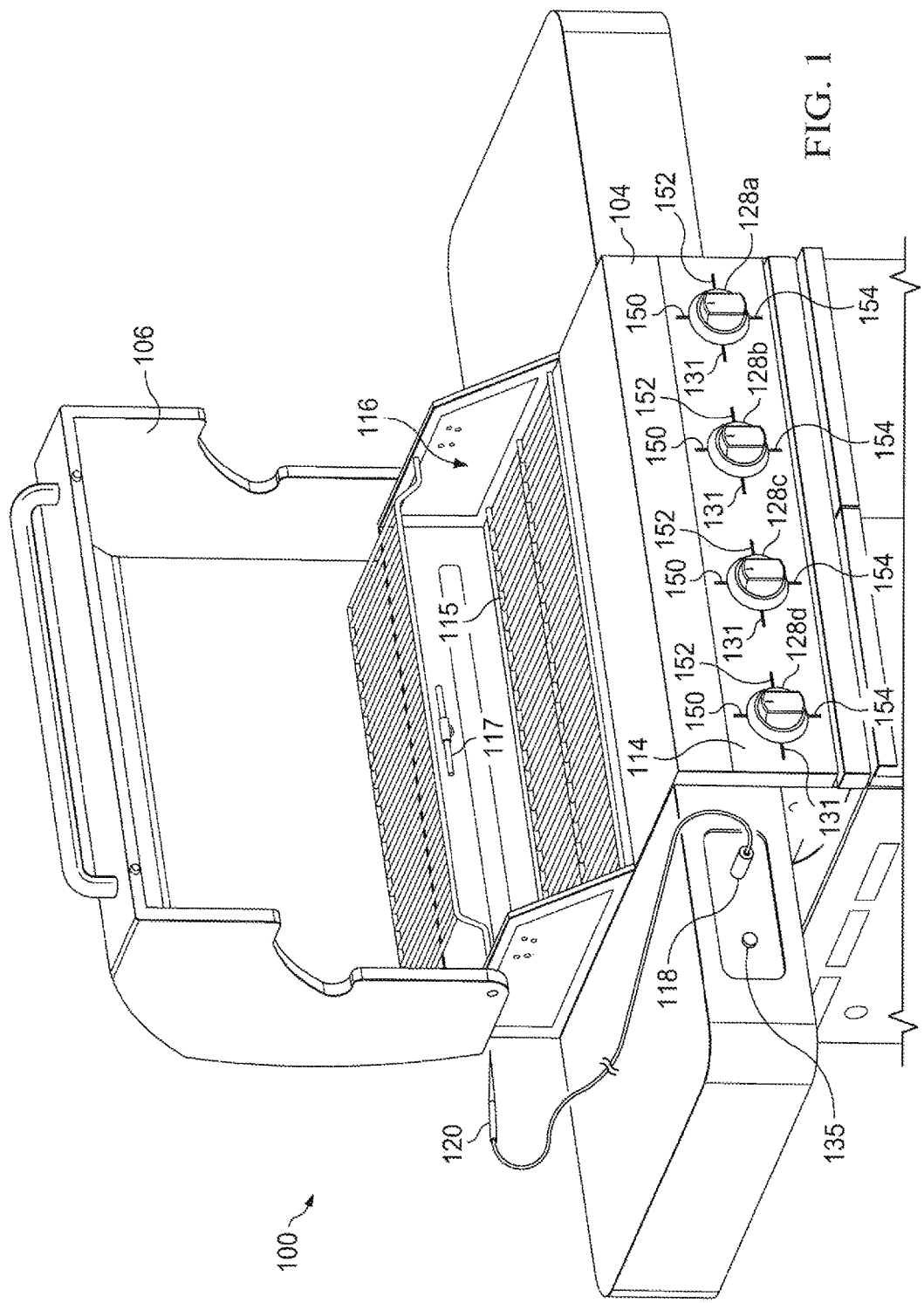
FIG. 1 is a perspective view of an embodiment 100 of the inventive outdoor gas cooking system.

An embodiment 100 of the inventive outdoor gas cooking system is illustrated in FIGS. 1-4. The inventive cooker 100 comprises: a grill housing 104; a pivotable lid or other cover 106 for opening and closing the top opening 116 of the grill housing 104; a firebox 105 defined within the grill housing 104; multiple (i.e., a plurality of) individual burner assemblies 110a, 110b, 110c, 110d having burner elements 112a, 112b, 112c, 112d positioned within the firebox 105; one or more removable cooking grates or cooking grate assemblies 115 positioned above the burner elements 112a, 112b, 112c, 112d and preferably positioned at or near the top opening 116 of the grill housing 104; a front control panel 114; and an inventive automated gas fuel control system 125 or 225.

In addition, the inventive outdoor gas cooker 100 can also comprise: (a) burner flame monitors comprising thermocouples or other burner temperature probes 113a, 113b, 113c, 113d positioned at or in close proximity to (preferably within 1 cm of) each of the burner elements 112a, 112b, 112c, 112d; (b) one or more operating temperature probes 117 positioned at or in proximity to (preferably within 3 cm of) the upper or lower surface(s) of the cooking grate(s) 115 or otherwise positioned in the firebox 105 or in an exhaust flow path from the gas cooker 100 or in the space within the pivotal lid or cover 106 above the cooking grate assembly 115; and (c) a meat/food product temperature probe 120 which is connected, for example, to a port 118 provided on the cooker 100 or is otherwise electronically linked to a control unit 134 or 234 of the control system 125 or 225. The operating temperature probe 117 is preferably an internal vent temperature sensor, positioned in the exhaust flow path of the combustion product gas produced in the cooker 100, at the back of the cooker 100 in the space above the cooking grate 115 as illustrated in FIG. 1.

Each of the burner assemblies 110a, 110b, 110c, 110d used in the inventive cooker 100 can be a tube burner assembly, a pan burner assembly, a box burner assembly, an infrared burner assembly, or generally any other type of gas fuel burner assembly known in the art. Each of the gas burner assemblies 110a, 110b, 110c, and 110d is preferably a tube burner assembly which comprises: a tube burner element 112a, 112b, 112c, or 112d which extends from front to back through a lower or mid portion of the firebox 105; a fuel inlet 124a, 124b, 124c, or 124d for delivering propane or other suitable gas fuel from a main fuel supply manifold or line 124 to the burner element 112a, 112b, 112c, or 112d; a manual control valve 126a, 126b, 126c, or 126d included in the individual fuel inlet 124a, 124b, 124c, or 124d for manually controlling the fuel rate and for shutting off the flow of fuel to the burner element 112a, 112b, 112c, or 112d; and a hand knob or dial 128a, 128b, 128c, or 128d for operating the manual control valve 126a, 126b, 126c, or 126d.

A main fuel supply line, tube, manifold or other conduit 124 delivers the gas fuel to the inventive cooker 100 from a propane tank or other gas fuel supply source (not shown). The hand knobs 128a, 128b, 128c, and 128d for operating the manual control valves 126a, 126b, 126c, and 126d are preferably located on the front control panel 114 of the inventive cooker 100.

Although the inventive cooker 100 is shown and described herein as having four burner elements 112a, 112b, 112c, and 112d, it will be understood that the inventive automated gas fuel control system 125 or 225 can be used for controlling, as a group, all of the burners in a gas cooker having two, three, four, five or any number of multiple burners.

Figure 2:
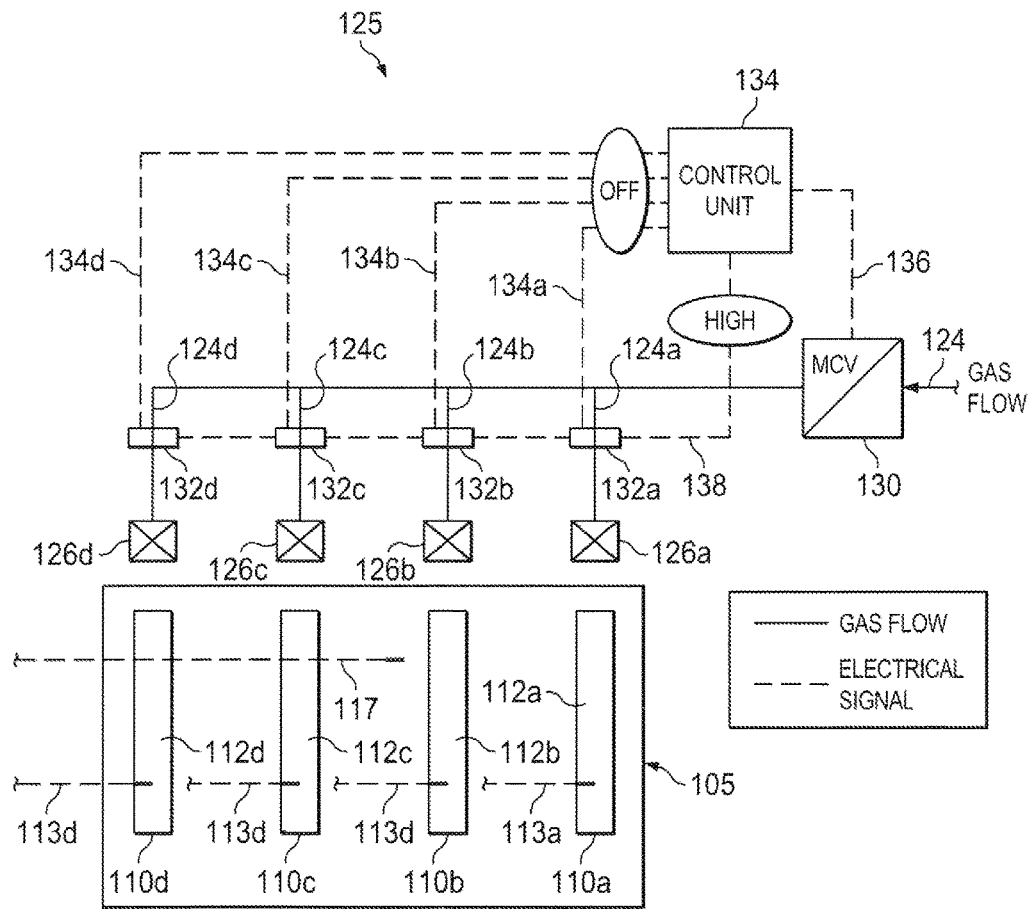
FIG. 2 schematically illustrates an embodiment 125 of an inventive automated gas fuel control system for the cooker 100.

As illustrated in FIG. 2, the embodiment 125 of the inventive automated gas fuel control system for the outdoor cooker 100 preferably comprises: (a) a Master Control Valve (MCV) 130 located in the main fuel supply conduit 124 upstream of the individual burner fuel supply inlets 124a, 124b, 124c, 124d and upstream of the individual burner control valves 126a, 126b, 126c, 126d; (b) individual valve position switches or other electronic valve position detectors 132a, 132b, 132c, 132d for detecting at least one operating position or a range of operating positions of the individual burner control valves 126a, 126b, 126c, 126d; and (c) a control unit 134.

The MCV 130 can be any type of electric control valve capable of being used in an outdoor gas cooker for automatically controlling the gas fuel rate. Examples of suitable electric control valves include, but are not limited to, electric proportioning solenoid valves, motor driven linear or rotary valves, or variable pressure controlling devices.

By way of example, but not by way of limitation, the valve position switches 132a, 132b, 132c, 132d can be operable for sensing the degree, or position, of valve stem rotation for the individual, manually operated burner control valves 126a, 126b, 126c, 126d. However, it will be understood that other types of valve position sensors can be used, particularly if the manual control valves are actuated using mechanisms other than rotating stems.

The control unit 134 receives the electronic valve position signals 134a, 134b, 134c, 134d produced or relayed by the valve position detectors 132a, 132b, 132c, 132d. The control unit 134 can also receive electronic temperature measurement signals from the meat/food product temperature probe 120, the burner temperature probes 113a, 113b, 113c, 113d, and/or the operating temperature probe(s) 117.

The control unit 134 can include any desired type and/or number of components wherein, for example (a) the components comprise separate, electronically linked modules which are located together or at different locations in the inventive cooker 100 or (b) the components are located together and electronically linked on a single circuit board or (c) the components are otherwise located together in a single piece of hardware. It will also be understood, however, that at least some of the components of the control unit 134, and/or the functions thereof, can alternatively be located or performed (1) in the World Wide Web using a remote server or the cloud, (2) in a hand held remote, (3) in an app for a smart phone or a tablet, (4) in other hand held devices, (5) etc.

Figure 4:
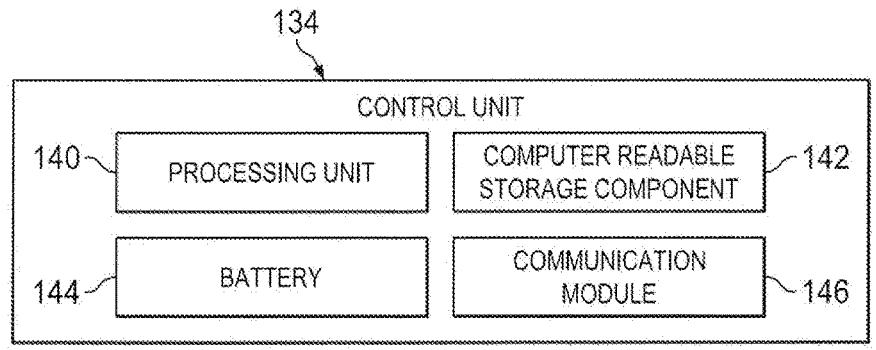
FIG. 4 schematically illustrates an embodiment 134 of a control unit used in the inventive automated control system 125.

As illustrated in FIG. 4, the control unit 134 preferably comprises a microprocessor or other computer processing unit 140. By way of example, but not by way of limitation, the control unit 134 can also include: a computer readable medium, device, or other storage component 142, which is readable by the processing unit 140; a battery 144 and/or a power cord for powering the control unit 134 and the other electrical components of the automated gas fuel control system 125; and a Bluetooth, radio frequency, infrared, Wi Fi, wired, and/or other communication module 146.

The control unit 134 preferably contains and implements programmed instructions for (a) analyzing the various input signals which it receives, (b) sending an electric current or other electronic signal 136 to the MCV 130 for directing the operation of the MCV 130, and (c) optionally performing other operations. The computer readable storage component 142 of the control unit 134 can have the control logic program or routines (i.e., the programmed procedure) for any desired automated cooking procedures, cooking recipes, MCV activation, shut down protocols and procedures, monitoring, reporting, or other procedures or operations of the inventive cooker 100 stored (i.e., embodied) thereon. Alternatively, as indicated above, some or all of these programmed procedures or portions thereof can be located or performed elsewhere in the inventive cooker 100, in the World Wide Web using a remote server or the cloud, in a hand held remote, in an app for a smart phone or a tablet, in other hand held devices, etc. Also, whether stored on a computer readable storage component 142 of the control unit 134 or elsewhere, cooking recipes and other operations can be pre-loaded by the manufacturer or supplier of the inventive cooker 100 or can be created and stored by the user. The user can create recipes, for example, from scratch or by modifying existing recipes In FIG. 2, the gas fuel control system 125 is illustrated as using a single series connection 138 which connects the valve position indicators 132a, 132b, 132c, 132d in series, thereby allowing the system to operate in accordance with an operating scenario 300 (discussed more fully below) such that a closed circuit will only be formed when the detectors 132a, 132b, 132c, 132d determine that all of the burner control valves 126a, 126b, 126e, 126d have been manually set at a MCV activation position 131. The MCV activation position 131 will preferably be, for example, a maximum flow position of the manual control valves 126a, 126b, 126c, 126d, a high heat cooking position of the manual control valves 126a, 126b, 126c, 126d as indicated by the burner control knobs 128a, 128b, 128c, 128d, or any other position (preferably at or above 50% open) wherein when all of the manual control valves 126a, 126b, 126c, 126d are simultaneously placed in this position, the control unit 134 will allow or cause the MCV 130 to be activated for automatically controlling the total fuel gas flow rate delivered to the entire bank of burner elements 112a, 112b, 112c, 112d.

Preferably, in this and in other programmed control scenarios, when the control unit 134 determines that all of the manual control valves 126a, 126b, 126c, 126d are in the MCV activation position or are in other positions corresponding to the programmed control scenarios, the control unit 134 will allow the user to activate the operation of the MCV 130 for automatically controlling the rate of fuel gas flow to the entire bank of burner elements 112a, 112b, 112c, 112d by pushing a button 135 on the cooker 100 and/or by operating some other activator located on the cooker 100, on a hand held device, or elsewhere.

Figure 3:
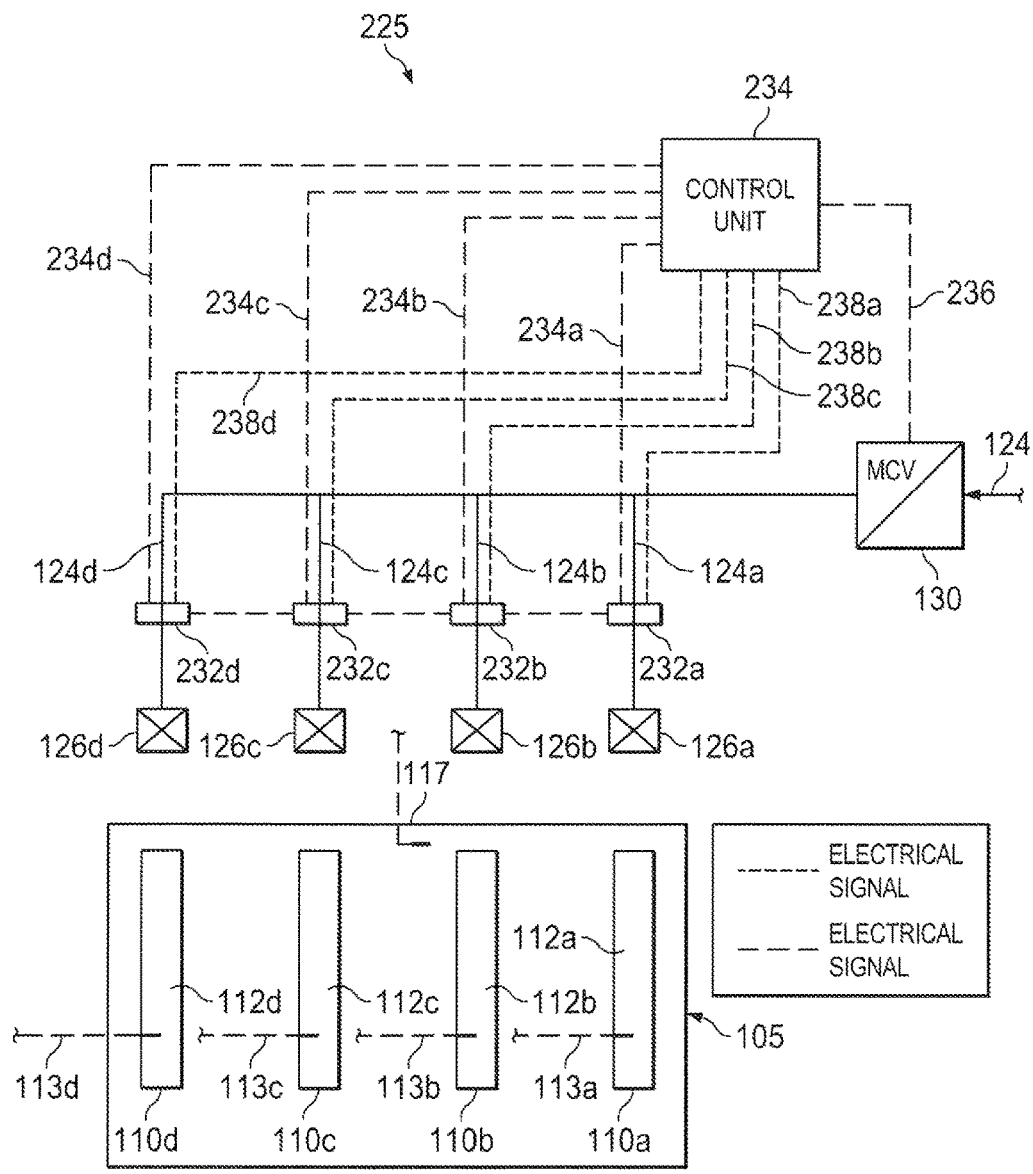
FIG. 3 schematically illustrates an alternative embodiment 225 of the inventive automated gas fuel control system for the cooker 100.

The above-mentioned alternative embodiment 225 of the fuel gas control system for the inventive cooker 100 is illustrated in FIG. 3. As with the control system 125, the control system 225 preferably comprises: (a) a Master Control Valve (MCV) 230 located in the main fuel supply conduit 124 upstream of the individual burner fuel supply inlets 124a, 124b, 124c, 124d and upstream of the individual manual control valves 126a, 126b, 126c, 126d; (b) individual valve position switches or other electronic valve position detectors 232a, 232b, 232c, 232d for detecting the operating positions of the individual burner control valves 126a, 126b, 126c, 126d; and (c) a control unit 234.

In contrast to the fuel gas control system 125, each of the valve position indicators 232a, 232b, 232c, and 232d of the alternative control system 225 has (a) its own individual electrical feed 238a, 238b, 238c, or 238d which extends from the control unit 234 to the valve position indicator 232a, 232b, 232c, or 232d and (b) its own electrical return signal 234a, 234b, 234c, or 234d which extends back from the valve position indicator 232a, 232b, 232c, or 232d to the control unit 234. This allows each of the individual valve position indicators 232a, 232b, 232c, and 232d to independently, and preferably continuously, inform the control unit 134 as to the current actual position of each of the manual control valves 126a, 126b, 126c, and 126d, regardless of whether the manual control valves 126a, 126b, 126c, and 126d are in the same or different positions.

Preferably, regarding each of the individual manual control valves 126a, 126b, 126c, and 126d, the valve position indicators 232a, 232b, 232c, and 232d of the control system 225 will independently detect and continuously notify the control unit 234 as to whether the individual manual control valve 126a, 126b, 126c, or 126d is in an off position 150, a low heat set position 152, a medium heat set position 154, or a high heat set position 131. These manual settings are preferably also shown on the control panel 114 of the cooker 100 by the positions of the individual burner control knobs 128a, 128b, 128c, and 128d.

Figure 5:
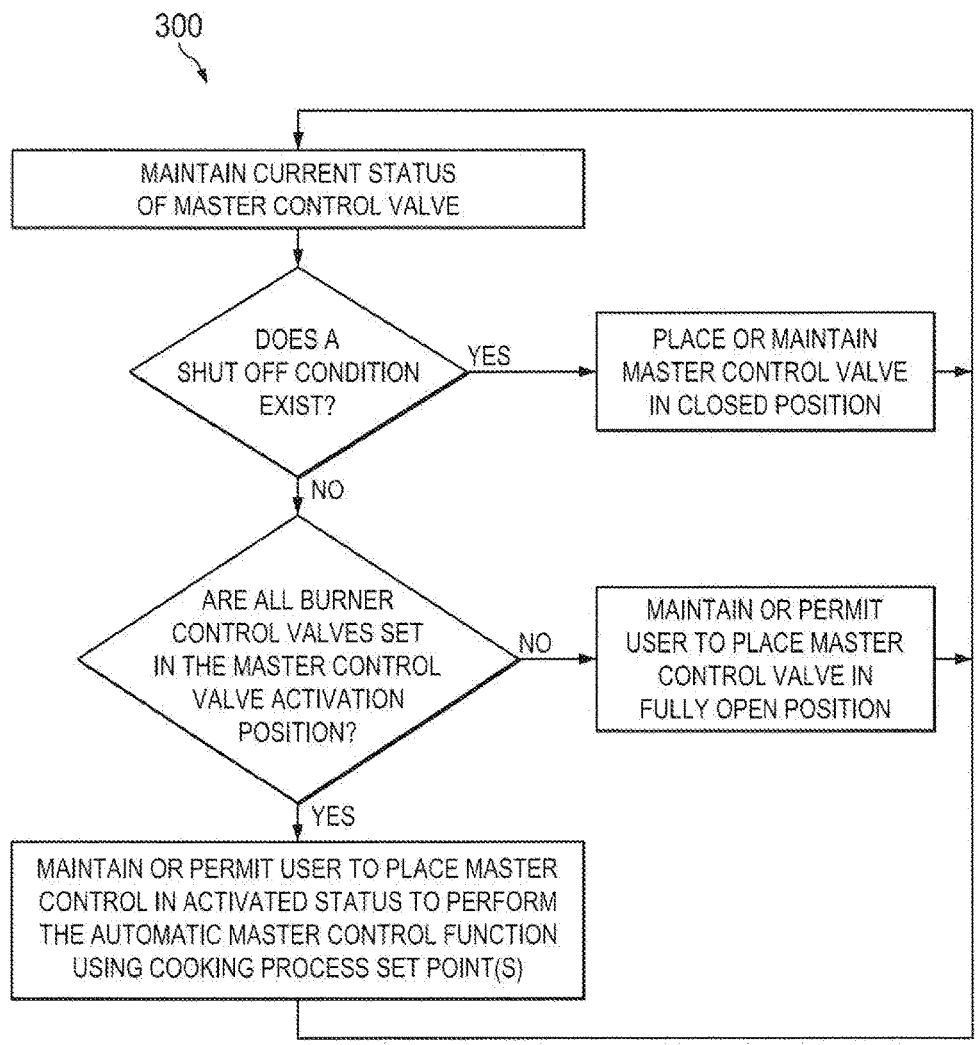
FIG. 5 is a flow chart of a program code embodied and used in the inventive automated control system 125 or 225 for performing an automated control procedure 300.

The above-mentioned master control operational scenario 300 for the inventive cooker 100 can be performed using either the fuel gas control system 125 or the alternative fuel gas control system 225. The automated master control scenario 300 is illustrated in FIGS. 5-7. As noted above, in the operational scenario 300, the MCV 130 will not operate, or will not be allowed to operate, to automatically control the rate of flow of the fuel gas to the multiple burner elements 112a, 112b, 112c, and 112d unless the individual manual control valves 126a, 126b, 126c, and 126d of all of the burner elements 112a, 112b, 112c, and 112d are each set to a MCV activation position 131. As indicated above, the MCV activation position 131 for the control scenario 300 will preferably be, for example, a maximum flow position of the manual control valves 126a, 126b, 126c, and 126d, a high heat cooking position of the manual control valves 126a, 126b, 126c, and 126d, or any other preselected position (preferably at or above 50% open).

In the master control scenario 300, the simultaneous positioning of all of the manual control valves 126a, 126b, 126c, and 126d in the MCV activation position 131 will either automatically activate the MCV 130 for controlling the rate of fuel gas flow to the entire set of burner elements 112a, 112b, 112c, and 112d or will more preferably allow the user to activate the master control function of the MCV 130 by pushing the master control activation button 135 on the cooker 100 or by operating some other activator located on the cooker 100, on a hand held device, or elsewhere.

This is illustrated in FIG. 6 wherein each of the manual control valves 126a, 126b, 126c, and 126d for the burner elements 112a, 112b, 112c, and 112d has (a) a minimum or low fuel flow setting 152 which, during 100% manual operation, provides a minimum or low design fuel flow rate to the burner of, for example, 5000 BTU/hour (as expressed, for illustration purposes, in terms of the heating value of the gas fuel), (b) an intermediate gas fuel flow setting 154 which, during 100% manual operation, provides an intermediate gas fuel flow rate to the burner of, for example, 7500 BTU/hour, and (c) a maximum or high gas fuel flow setting 131 which is the MCV activation setting and which, during 100% manual operation, provides a maximum or high gas fuel flow rate to the burner of, for example, 10,000 BTU/hour.

When each of the manual control valves 126a, 126b, 126c, and 126d is set at its maximum or high fuel flow setting 131 as shown in FIG. 6, the user can activate the master control function of the MCV 130 by pushing the master control activation button 135 on the cooker 100 or by operating some other activator located on the cooker 100, on a hand held device, or elsewhere. The MCV 130 will then perform a throttling function based upon one or more targeted set points, as will be discussed more fully below, to automatically control the total rate of gas fuel flow to the entire bank of burner elements 112a, 112b, 112c, and 112d. Moreover, in performing this automatic control function, the MCV 130 will also preferably operate within a minimum to maximum total fuel gas delivery range such that (a) the MCV 130 will always deliver at least a minimal gas fuel flow rate (in this case 20,000 BTU/Hour) amounting to the total of the minimal design flow rates of all of the burner elements 112a, 112b, 112c, and 112d and (b) the MCV 130 will also deliver up to at least a maximum gas fuel flow rate (in this case 40,000 BTU/Hour) amounting to the total of the high or maximum design flow rates of all of the burner elements 112a, 112b, 112c, and 112d.

However, in the master control scenario 300, if at least one of the individual manual control valves 126a, 126b, 126c, or 126d for the multiple burners 112a, 112b, 112c, 112d is not moved to, or is taken out of, the MCV activation position 131, the MCV 130 preferably will not operate or will not be allowed to operate to automatically control the rate of flow of the gas fuel to the burner elements 112a, 112b, 112c, and 112d. Rather, when at least one of the manual control valves 126a, 126b, 126c, or 126d is not in the MCV activation position 131, and unless a system shut-down event has occurred, the MCV 130 will preferably remain in a 100% open position so that each individual burner 112a, 112b, 112c, 112d will be manually controlled using only the manual control valve 126a, 126b, 126c, or 126d for the burner.

This is illustrated in FIG. 7 wherein the burner 112d has been turned off (i.e., is no longer in the MCV activation position 131) but all of the remaining burners are still operating at the high set point 131. In this case, the master control function of the MCV 130 will be deactivated and the MCV 130 will then automatically move to and remain in, preferably after a suitable time lag of about 2 minutes or more, a full open or other maximum flow position. At that point, the gas fuel flow rates to the burner elements 112a, 112b, 112c, and 112d will be individually set and controlled solely by the operating positions of the manual control valves 126a, 126b, 126c, and 126d. The full open or maximum flow position of the MCV 130 will preferably be of a size and capacity sufficient to deliver up to at least a maximum fuel gas flow rate (in this case 40,000 BTU/Hour) amounting to the total of the high or maximum design flow rates of all of the burner elements 112a, 112b, 112c, and 112d.

An example of a program code embodied on the computer readable storage component 142 for operating the inventive cooking system in accordance with the master control scenario 300 is illustrated in FIG. 5. In accordance with the program code shown in FIG. 5, the control unit 134 or 234 of the gas fuel control system 125 or 225 continuously operates to determine if a commanded shut off condition exists and, if not, determine whether all of the burner manual control valves 126a, 126b, 126c, and 126d are set in the Master Control Valve activation position 131. If a commanded shut off condition exists, the Master Control Valve 130 is placed or maintained in a closed position. If no commanded shutoff condition exists but at least one burner control valve 126a, 126b, 126c, or 126d is not in the Master Control Valve activation position 131, the Master Control Valve 130 is preferably placed or maintained in a fully open position. However, if no commanded shut off condition exists and all of the burner control valves 126a, 126b, 126c, and 126d are in the Master Control Valve activation position 131, the Master Control Valve 130 will or can be placed in, or will be maintained in, an activated status to perform the automatic master control function of the MCV 130 using one or more cooking process control set points.

In other words, as mentioned above, when all of the manual control valves 126a, 126b, 126c, and 126d are in the MCV activation position 131 and the master control operation 300 of the MCV 130 is activated, the MCV 130 will perform a throttling function for the inventive gas cooker 100 wherein the gas flow to all of the burner elements 112a, 112b, 112c, and 112d as a group will be set and automatically controlled as an electronic control function of the MCV 130 and the control unit 134 or 234. The throttling control set point(s) for the control unit 134 or 234 and the MCV 130 can be any desired measured or calculated target value(s) related to the food product, the operation of the cooker 100, conditions in the cooker 100, etc. involved in the cooking process. Examples of such values and parameters include, but are not limited to, the temperature of the cooker exhaust gas (e.g., as measured by the temperature probe 117), the temperature of the food product (e.g., as measured by the temperature probe 120), the temperature at or near the cooking grate(s) 115, the temperature in the firebox 105, the ambient temperature outside of the cooker 100, the cooking time, or any combination thereof.

As one example, the control unit 134 or 234 and the MCV 130 can be operated to automatically reach and maintain a set cooking temperature as measured by the temperature probe 117. Alternatively or in addition, the control unit 134 or 234 and the MCV 130 can be operated to: (a) automatically stop the cooking process or move to a different cooking or warming temperature when a targeted food temperature is reached or a set cooking time has expired or (b) operate the grill on high for a certain period of time following cooking in order to burn off food residue and then turn off the gas to the burners and notify the user that this has been done and instruct the user to manually turn off the gas at the fuel source.

An example of another control scenario 325 which can be implemented using the inventive fuel gas control system 225 is illustrated in FIG. 8. The control scenario 325 is a programmed indirect cooking procedure wherein the valve position indicators 232a, 232b, 232c, and 232d inform the control unit 234 that only one burner valve (e.g., valve 126d) is set in the maximum flow position 131 and all of the remaining burners are in the off position 150. In the scenario 325, the MCV 130 will preferably operate when activated by the user to automatically control the gas fuel flow rate to the fully open burner 112a, based upon one or more target parameters, within a range extending from the minimum design flow rate 152 (in this case 5000 BTU/Hour) to the maximum design flow rate 131 (in this case 10,000 BTU/Hour) for the individual burner 112d.

An example of another control scenario 350 which can be implemented using the inventive fuel gas control system 225 is illustrated in FIG. 9. The control scenario 350 is a programmed indirect cooking procedure wherein the valve position indicators 232a, 232b, 232c, and 232d inform the control unit 234 that only two burner valves (e.g., valves 126a and 126d) are set in the maximum flow position 131 and all of the remaining burners are in the off position 150. In the scenario 350, the MCV 130 will preferably operate when activated by the user to automatically control the gas fuel flow rate to the fully open burners 112a and 112d, based upon one or more target parameters, within a range extending from the sum of the minimum design flow rates 152 of the burners 112a and 112d (in this case 10,000 BTU/Hour) to the sum of the maximum design flow rates 131 of the burners 112a and 112d (in this case 20,000 BTU/Hour).

An example of another control scenario 375 which can be implemented using the inventive fuel gas control system 225 is illustrated in FIG. 10. The control scenario 350 is a programmed indirect cooking procedure wherein the valve position indicators 232a, 232b, 232e, and 232d inform the control unit 234 that only three burner valves (e.g., valves 126a, 126b, and 126d) are set in the maximum flow position 131 and the remaining burner 126c is in the off position 150. In the scenario 375, the MCV 130 will preferably operate when activated by the user to automatically control the gas fuel flow rate to the fully open burners 112a, 112b and 112d, based upon one or more target parameters, within a range extending from the sum of the minimum design flow rates 152 of the burners 112a, 112b, and 112d (in this case 15,000 BTU/Hour) to the sum of the maximum design flow rates 131 of the burners 112a, 112b, and 112d (in this case 30,000 BTU/Hour).

Figure 11:
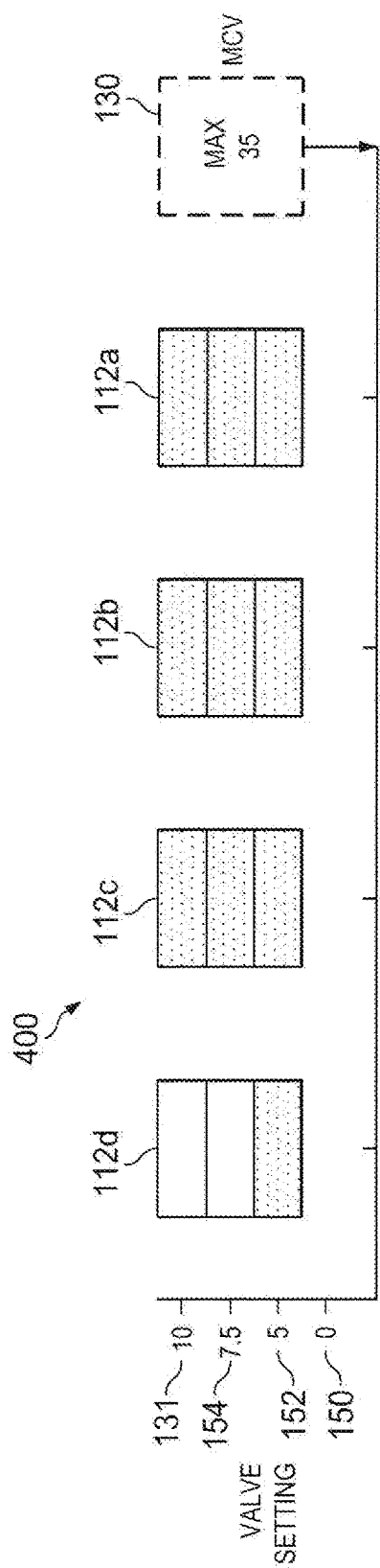
FIG. 11 schematically illustrates another control scenario 400 which can be implemented using the inventive fuel gas control system 225.

An example of another control scenario 400 which can be implemented using the inventive fuel gas control system 225 is illustrated in FIG. 11. The control scenario 400 is a programmed precision flow control procedure wherein the valve position indicators 232a, 232b, 232c, and 232d inform the control unit 234 that one of the burner valves 126d is in the minimum flow position 152 and all of the remaining burner valves 126a, 126b, and 126c are set in the maximum flow position 131. When activated in the precision flow control scenario 400, the MCV 130 operates as a flow control valve to control the total gas fuel flow to the bank of burner elements 112a, 112b, 112c, and 112d at a rate which is not substantially more than or substantially less than (i.e., preferably within ±10% and more preferably within ±5% of) the sum of the individual design flow rates of the burner elements 112a, 112b, 112c, and 112d at these set points. In this case, the sum of the design flow rates at these set points would be 10,000+10,000+10,000+5000=35,000 BTU/Hour.

Figure 12:
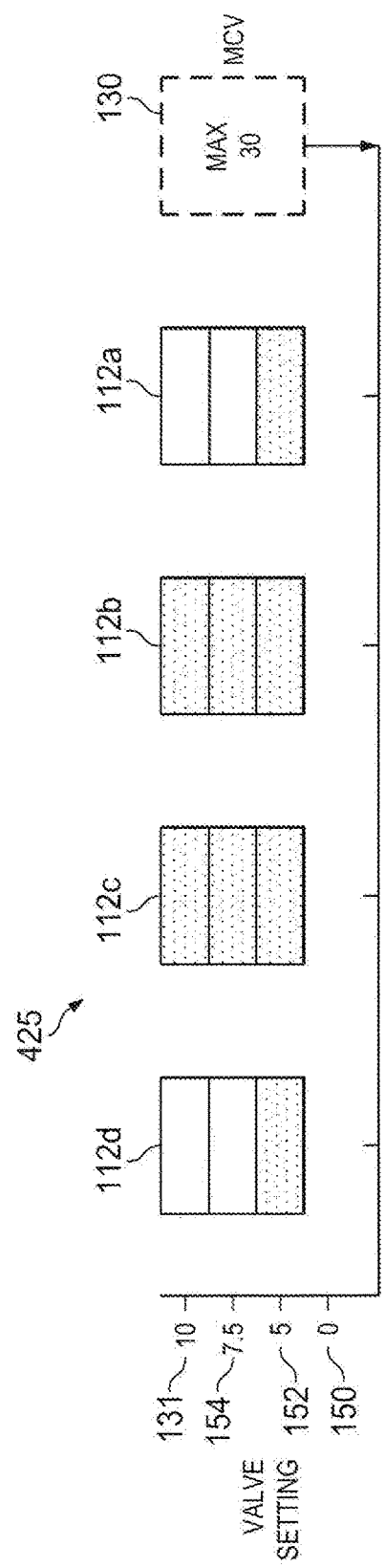
FIG. 12 schematically illustrates another control scenario 425 which can be implemented using the inventive fuel gas control system 225.

An example of another control scenario 425 which can be implemented using the inventive fuel gas control system 225 is illustrated in FIG. 12. The control scenario 425 is a programmed precision flow control procedure wherein the valve position indicators 232a, 232b, 232c, and 232d inform the control unit 234 that two of the burner valves 126a and 126d are in the minimum flow position 152 and all of the remaining burner valves 126b and 126c are set in the maximum flow position 131. When activated in the precision flow control scenario 425, the MCV 130 operates as a flow control valve to control the total gas fuel flow to the bank of burner elements 112a, 112b, 112c, and 112d at a rate which is not substantially more than or substantially less than (i.e., preferably within ±10% and more preferably within ±5% of) the sum of the individual design flow rates of the burner elements 112a, 112b, 112c, and 112d at these set points. In this case, the sum of the design flow rates at these set points would be 5,000+10,000+10,000+5000=30,000 BTU/Hour.

An example of another control scenario 450 which can be implemented using the inventive fuel gas control system 225 is illustrated in FIG. 13. The control scenario 450 is a programmed precision flow control procedure wherein the valve position indicators 232a, 232b, 232c, and 232d inform the control unit 234 that three of the burner valves 126a, 126b, and 126d are in the minimum flow position 152 and the remaining burner valve 126c is set in the maximum flow position 131. When activated in the precision flow control scenario 450, the MCV 130 operates as a flow control valve to control the total gas fuel flow to the bank of burner elements 112a, 112b, 112c, and 112d at a rate which is not substantially more than or substantially less than (i.e., preferably within ±10% and more preferably within ±5% of) the sum of the individual design flow rates of the burner elements 112a, 112b, 112c, and 112d at these set points. In this case, the sum of the design flow rates at these set points would be 5,000+5,000+10,000+5000=25,000 BTU/Hour.

An example of another control scenario 475 which can be implemented using the inventive fuel gas control system 225 is illustrated in FIG. 14. The control scenario 475 is a programmed precision flow control procedure wherein the valve position indicators 232a, 232b, 232c, and 232d inform the control unit 234 that all of the burner valves 126a, 126b, 126c, and 126d are in the minimum flow position 152. When activated in the precision flow control scenario 475, the MCV 130 operates as a flow control valve to control the total gas fuel flow to the bank of burner elements 112a, 112b, 112c, and 112d at a rate which is not substantially more than or substantially less than (i.e., preferably within ±10% and more preferably within ±5% of) the sum of the individual design flow rates of the burner elements 112a, 112b, 112c, and 112d at these set points. In this case, the sum of the design flow rates at these set points would be 5,000+5,000+5,000+5000=20,000 BTU/Hour.

An example of another control scenario 500 which can be implemented using the inventive fuel gas control system 225 is illustrated in FIG. 15. The control scenario 500 is a programmed precision flow control procedure wherein the valve position indicators 232a, 232b, 232c, and 232d inform the control unit 234 that two of the burner valves 126a and 126d are in the minimum flow position 152, one of the burner valves 126b is in the off position 150, and the remaining burner valve 126c is set in the maximum flow position 131. When activated in the precision flow control scenario 500, the MCV 130 operates as a flow control valve to control the total gas fuel flow to the bank of burner elements 112a, 112b, 112c, and 12d at a rate which is not substantially more than or substantially less than (i.e., preferably within ±10% and more preferably within ±5% of) the sum of the individual design flow rates of the burner elements 112a, 112b, 112c, and 112d at these set points. In this case, the sum of the design flow rates at these set points would be 5,000+0+10,000+5000=20,000 BTU/Hour.

Also, as mentioned above, the control unit 134 or 234 and the MCV 130 can be operated to automatically close the MCV 130 to stop all gas flow to the burners 112a, 112b, 112c, and 112d in the event that a shut off condition occurs. Examples of possible shut off conditions include, but are not limited to: (a) a loss of flame (e.g., due to a gust of wind) from one or more of the burners 112a, 112b, 112c, and 112d as detected by one or more of the burner temperature probes 113a, 113b, 113c, 113d or (b) an abnormally high temperature detected by one or more temperature probes 117 indicating a likely flaring or temperature runaway condition above the cooking grate(s) 115.

Thus, the present invention is well adapted to carry out the objects and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within this invention as defined by the claims.

What is claimed is:

1. An outdoor cooking system comprising:
    a housing;
    a control unit;
    two or more gas fuel burners or burner elements in the housing, each of the gas fuel burners or burner elements having a gas fuel inlet which includes a manual control valve and a valve position detector which automatically sends or relays to the control unit an electronic signal indicating at least one operating position of the manual control valve;
    a gas fuel supply conduit which supplies a gas fuel to the gas fuel inlets of the gas fuel burners or burner elements; and
    a master control valve in the gas fuel supply conduit upstream of all of the manual control valves,
    wherein the control unit automatically determines whether all of the manual control valves are in a master control valve activation position so that when all of the manual control valves are in the master control valve activation position, the control unit allows a user to activate, or the control unit itself automatically activates, a master control function of the master control valve wherein the master control valve automatically controls a total rate flow of the gas fuel to all of the gas fuel burners or burner elements in the housing based upon at least one cooking process control set point and
    when the control unit detects that at least one of the manual control valves is not in the master control valve activation position, the control unit will not permit the master control function of the master control valve to be activated.

2. The outdoor cooking system of claim 1 wherein the master control valve activation position is a maximum flow position for each of the manual control valves.

3. The outdoor cooking system of claim 1 wherein the master control valve activation position is a designated high heat manual set point position for each of the manual control valves.

4. The outdoor cooking system of claim 1 wherein the master control valve is an electric proportioning solenoid valve.

5. An outdoor cooking system comprising:
    a housing;
    a control unit;
    two or more gas fuel burners or burner elements in the housing, each of the gas fuel burners or burner elements having a gas fuel inlet which includes a manual control valve and a valve position detector which automatically sends or relays to the control unit an electronic signal indicating at least one operating position of the manual control valve;
    a gas fuel supply conduit which supplies a gas fuel to the gas fuel inlets of the gas fuel burners or burner elements; and
    a master control valve in the gas fuel supply conduit upstream of all of the manual control valves,
    wherein the control unit comprises a processing unit and a program code which is embodied on a computer readable storage component and is readable by the processing unit to automatically determine whether all of the manual control valves are in a master control valve activation position and to operate the master control valve according to a programmed procedure in which when all of the manual control valves are in the master control valve activation position, a user is allowed to activate, or the control unit itself automatically activates, a master control function of the master control valve wherein the master control valve automatically controls a total rate of flow of the gas fuel to all of the gas fuel burners or burner elements in the housing based upon at least one cooking process control set point and
    when in accordance with the programmed procedure of the program code embodied on the computer readable storage component the control unit determines that at least one of the manual control valves is not in the master control valve activation position, the programmed procedure will not permit the master control function of the master control valve to be activated.

6. The outdoor cooking system of claim 5 wherein the master control valve activation position is a maximum flow position for each of the manual control valves.

7. The outdoor cooking system of claim 5 wherein the master valve activation position is a designated high heat manual set point position for each of the manual control valves.

8. The outdoor cooking system of claim 5 wherein the master control valve is an electric proportioning solenoid valve.

9. An outdoor cooking system comprising:
    a housing;
    a control unit;
    two or more gas fuel burners or burner elements in the housing, each of the gas fuel burners car burner elements having a gas fuel inlet which includes a manual control valve and a valve position detector which automatically sends or relays to the control unit an electronic signal indicating an operating position of the manual control valve;
    a gas fuel supply conduit which supplies a gas fuel to the gas fuel inlets of the gas fuel burners or burner elements; and
    a master control valve in the gas fuel supply conduit upstream of all of the manual control valves,
    wherein the control unit automatically determines whether the manual control valve for each of the gas fuel burners or burner elements is either closed or in a master control valve activation position so that when the manual control valves for all of the gas fuel burners or burner elements are either closed or in the master control valve activation position and the manual control valve of one or more of the gas fuel burners burner elements is in the master control valve activation position, the control unit allows a user to activate, or the control unit itself automatically activates, a master control function of the master control valve wherein the master control valve automatically controls a total rate of flow of the gas fuel, based upon at least one cooking process control set point, to all of the one or more gas fuel burners or burner elements in the housing for which the master control valve for the gas fuel burner or burner element is in the master control valve activation position and the master control valve activation position is a designated high heat manual set point position for each of the manual control valves.

10. The outdoor cooking system of claim 9 wherein when the master control valve is not performing the master control function and unless an emergency shut down occurrence is detected by the control unit, the master control valve remains in a fully open position.

11. An outdoor cooking system comprising:
a housing;
a control unit;
at least three gas fuel burners or burner elements in the housing, each of the gas fuel burners or burner elements having a gas fuel inlet which includes a manual control valve having a plurality of manual set points and a valve position detector which automatically sends or relays to the control unit an electronic signal indicating a current manual set point of the manual control valve, wherein one of the manual set points is an off position of the manual control valve for a zero design flow rater of a gas fuel and each remaining one of the manual set points is a partially or fully open position of the manual control valve having a design flow rate of the gas fuel greater than zero corresponding thereto;
a gas fuel supply conduit which supplies the gas fuel to the gas fuel inlets of the gas fuel burners or burner elements; and
a master control valve in the gas fuel supply conduit upstream of all of the manual control valves,
wherein the control unit automatically determines the current manual set point of each of the manual control valves and determines a total of the design flow rates corresponding to the current set points of all of the manual control valves, and the control unit allows a user to activate, or the control unit itself automatically activates, a master control function of the master control valve wherein the master control valve automatically controls a total flow of the gas fuel to all of the gas fuel burners or burner elements in the housing for which the manual control valve of the gas fuel burner or burner element is partially or fully open at a rate which is substantially a total of the design flow rates corresponding to the current set points of all of the manual control valves.

12. The outdoor cooking system of claim 11 wherein at least four of the gas fuel burners or burner elements are positioned in the housing.

13. An outdoor cooking system comprising:
a housing;
a control unit;
two or more gas fuel burners or burner elements in the housing, each of the gas fuel burners or burner elements having gas fuel inlet which includes a manual control valve and a valve position detector which automatically sends or relays to the control unit an electronic signal indicating at least one operating position of the manual control valve;
a gas fuel supply conduit which supplies a gas fuel to the gas fuel inlets of the gas fuel burners or burner elements; and
a master control valve in the gas fuel supply conduit upstream of all of the manual control valves,
wherein the control unit automatically determines whether all of the manual control valves are in a master control valve activation position so that when all of the manual control valves are in the master control valve activation position, the control unit allows a user to activate, or the control unit itself automatically activates, a master control function of the master control valve wherein the master control valve automatically controls a total rate of flow of the gas fuel to all of the gas fuel burners or burner elements in the housing based upon at least one cooking process control set point and when the master control valve is not performing the master control function, individual rates of flow of the gas fuel to the gas fuel burners or burner elements are separately controlled solely by the manual control valves.

14. The outdoor cooking system of claim 13 wherein when the master control valve is not performing the master control function and unless an emergency shut down occurrence is detected by the control unit, the master control valve remains in a fully open position.

15. An outdoor cooking system comprising:
a housing;
a control unit;
at least three gas fuel burners or burner elements in the housing, each of the gas fuel burners or burner elements having a gas fuel inlet which includes a manual control valve and a valve position detector which automatically sends or relays to the control unit an electronic signal indicating at least one operating position of the manual control valve;
a gas fuel supply conduit which supplies a gas fuel to the gas fuel inlets of the gas fuel burners or burner elements; and
a master control valve in the gas fuel supply conduit upstream of all of the manual control valves,
wherein the control unit automatically determines whether all of the manual control valves are in a master control valve activation position so that when all of the manual control valves are in the master control valve activation position, the control unit allows a user to activate, or the control unit itself automatically activates, a master control function of the master control valve wherein the master control valve automatically controls a total rate of flow of the gas fuel to all of the gas fuel burners or burner elements in the housing based upon at least one cooking process control set point.

16. The outdoor cooking system of claim 15 wherein at least four of the gas fuel burners or burner elements are positioned in the housing.

17. An outdoor cooking system comprising:
a housing;
a control unit;
two or more gas fuel burners or burner elements in the housing, each of the gas fuel burners or burner elements having a gas fuel inlet which includes a manual control valve and a valve position detector which automatically sends or relays to the control unit an electronic signal indicating at least one operating position of the manual control valve;
a gas fuel supply conduit which supplies a gas fuel to the gas fuel inlets of the gas fuel burners or burner elements; and
a master control valve in the gas fuel supply conduit upstream of all of the manual control valves,
wherein the control unit automatically determines whether all of the manual control valves are in a master control valve activation position so that when all of the manual control valves are in the master control valve activation position, the control unit allows a user to activate, or the control unit itself automatically activates, a master control function of the master control valve wherein the master control valve automatically controls a total rate of flow of the gas fuel to all of the gas fuel burners or burner elements in the housing based upon at least one cooking process control set point and the outdoor cooking system further comprises (a) a food product temperature sensor which senses a temperature of a food product as it is cooked in the outdoor cooking system and the cooking process control set point is a food product target temperature, (b) at least one cooking temperature sensor and the cooking process control set point is a target cooking temperature, or (c) at least one exhaust temperature sensor which is positioned for sensing a temperature of a combustion gas exhaust of the outdoor cooking system and the cooking process control set point is a target temperature for the combustion gas exhaust.

18. An outdoor cooking system comprising:
a housing;
a control unit;
two or more gas fuel burners or burner elements in the housing, each of the gas fuel burners or burner elements having a gas inlet which includes a manual control valve and a valve position detector which automatically sends or relays to the control unit an electronic signal indicating at least one operating position of the manual control valve;
a gas fuel supply conduit which supplies a gas fuel to the gas fuel inlets of the gas fuel burners or burner elements; and
a master control valve in the gas fuel supply conduit upstream of all of the manual control valves,
wherein the control unit comprises a processing unit and a program code which is embodied on a computer readable storage component and is readable by the processing unit to automatically determine whether all of the manual control valves are in a master control valve activation positron and to operate the master control valve according to a programmed procedure in which when all of the manual control valves are in the master control valve activation position, a user is allowed to activate, or the control unit itself automatically activates, a master control function of the master control valve wherein the master control valve automatically controls a total rate of flow of the gas fuel to all of the gas fuel burners or burner elements in the housing based upon at least one cooking process control set point and
when the master control valve is not performing the master control function, individual rates of flow of the gas fuel to the gas fuel burners or burner elements are separately controlled solely by the manual control valves.

19. The outdoor cooking system of claim 18 wherein in the programmed procedure when the master control valve is not performing the master control function and unless an emergency shut down occurrence is detected by the control unit, the master control valve remains in a fully open position.

20. An outdoor cooking system comprising:
a housing;
a control unit;
at least three gas fuel burners or burner elements in the housing, each of the gas fuel burners or burner elements having a gas fuel inlet which includes a manual control valve and a valve position detector which automatically sends or relays to the control unit an electronic signal indicating at least one operating position of the manual control valve;
a gas fuel supply conduit which supplies a gas fuel to the gas fuel inlets of the gas fuel burners or burner elements; and
a master control valve in the gas fuel supply conduit upstream of all of the manual control valves,
wherein the control unit comprises a processing unit and a program code which is embodied on a computer readable storage component and is readable by the processing unit to automatically determine whether all of the manual control valves are in a master control valve activation position and to operate the master control valve according to a programmed procedure in which when all of the manual control valves are in the master control valve activation position, user is allowed to activate, or the control unit itself automatically activates, a master control function of the master control valve wherein the master control valve automatically controls a total rate of flow of the gas fuel to all of the gas fuel burners or burner elements in the housing based upon at least one cooking process control set point.

21. The outdoor cooking system of claim 20 wherein at least four of the gas fuel burners or burner elements are positioned in the housing.

22. An outdoor cooking system comprising:
a housing;
a control unit;
two or more gas fuel burners or burner elements in the housing, each of the gas fuel burners or burner elements having a gas fuel inlet which includes a manual control valve and a valve position detector which automatically sends or relays to the control unit an electronic signal indicating at least one operating position of the manual control valve;
a gas fuel supply conduit which supplies a gas fuel to the gas fuel inlets of the gas fuel burners or burner elements; and
a master control valve in the gas fuel supply conduit upstream of all of the manual control valves,
wherein the control unit comprises a processing unit and a program code which is embodied on a computer readable storage component and is readable by the processing unit to automatically determine whether all of the manual control valves are in a master control valve activation position and to operate the master control valve according to a programmed procedure in which when all of the manual control valves are in the master control valve activation position, a user is allowed to activate, or the control unit itself automatically activates, a master control function of the master control valve wherein the master control valve automatically controls a total rate of flow of the gas fuel to all of the gas fuel burners or burner elements in the housing based upon at least one cooking process control set point and
the outdoor cooking system further comprises (a) a food product temperature sensor which senses a temperature of a food product as it is cooked in the outdoor cooking system and the cooking process control set point is a food product target temperature, (b) at least one, cooking temperature sensor and the cooking process control set point is a target cooking temperature, or (c) at least one exhaust temperature sensor which is positioned for sensing a temperature of a combustion gas exhaust of the outdoor cooking system and the cooking process control set point is a target temperature for the combustion gas exhaust.

23. An outdoor cooking system comprising:

a housing;

a control unit;

at least three gas fuel burners or burner elements in the housing, each of the gas fuel burners or burner elements having a gas fuel inlet which includes a manual control valve and a valve position detector which automatically sends or relays to the control unit an electronic signal indicating an operating position of the manual control valve;

a gas fuel supply conduit which supplies a gas fuel to the gas fuel inlets of the gas fuel burners or burner elements; and a master control valve in the gas fuel supply conduit upstream of all of the manual control valves, wherein the control unit automatically determines whether the manual control valve for each of the gas fuel burners or burner elements is either closed or in a master control valve activation position so that when the manual control valves for all of the gas fuel burners or burner elements are either closed or in the master control valve activation position and the manual control valve of one or more of the gas fuel burners or burner elements is in the master control valve activation position, the control unit allows a user to activate, or the control unit itself automatically activates, a master control function of the master control valve wherein the master control valve automatically controls a total rate of flow of the gas fuel, based upon at least one cooking process control set point, to all of the one or more gas fuel burners or burner elements in the housing for which the master control valve for the gas fuel burner or burner element is in the master control valve activation position.

24. An outdoor cooking system comprising:

a housing;

a control unit;

two or more gas fuel burners or burner elements in the housing, each of the gas fuel burners or burner elements having a gas fuel inlet which includes a manual control valve and a valve position detector which automatically sends or relays to the control unit an electronic signal indicating an operating position of the manual control valve;

a gas fuel supply conduit which supplies a gas fuel to the gas fuel inlets of the gas fuel burners or burner elements; and a master control valve in the gas fuel supply conduit upstream of all of the manual control valves, wherein the control unit automatically determines whether the manual control valve for each of the gas fuel burners or burner elements is either closed or in a master control valve activation position so that when the manual control valves for all of the gas fuel burners or burner elements are either closed or in the master control valve activation position and the manual control valve of one or more of the gas fuel burners or burner elements is in the master control valve activation position, the control unit allows a user to activate, or the control unit itself automatically activates, a master control function of the master control valve wherein the master control valve automatically controls a total rate of flow of the gas fuel, based upon at least one cooking process control set point, to all of the one or more gas fuel burners or burner elements in the housing for which the master control valve for the gas fuel burner or burner element is in the master control valve activation position and the outdoor cooking system further comprises (a) a food product temperature sensor which senses a temperature of a food product as it is cooked in the outdoor cooking system and the cooking process control set point is a food product target temperature, (b) at least one cooking temperature sensor and the cooking process control set point is a target cooking temperature, or a (c) at least one exhaust temperature sensor which is positioned for sensing a temperature of a combustion gas exhaust of the outdoor cooking system and the cooking process control set point is a target temperature for the combustion gas exhaust.

* * * * *

UNITED STATES PATENT AND TRADEMARK OFFICE
CERTIFICATE OF CORRECTION

PATENT NO. : 10,485,379 B2  
APPLICATION NO. : 15/644245  
DATED : November 26, 2019  
INVENTOR(S) : Bennett et al.

Page 1 of 1

It is certified that error appears in the above-identified patent and that said Letters Patent is hereby corrected as shown below:

In the Claims

Claim 9, Column 14, Line 41: Replace the word "car" with "or"

Claim 9, Column 14, Line 59: Add the word "or" after the word "burners" and before the word "burner"

Claim 11, Column 15, Line 23: Replace the word "rater" with "rate"

Claim 13, Column 15, Line 56: Add an "a" after the word "having" and before the word "gas"

Claim 22, Column 18, Line 67: Delete the "," after the word "one"

Claim 24, Column 20, Line 38: Delete the "a" after the word "or" and before "(c)"

Signed and Sealed this  
Second Day of June, 2020

Andrei Iancu  
*Director of the United States Patent and Trademark Office*